United States Patent [19]

Bauer et al.

[11] Patent Number: 4,800,466
[45] Date of Patent: Jan. 24, 1989

[54] ILLUMINATION DEVICE FOR A FRONT PANEL

[75] Inventors: Karl-Heinz Bauer; Gerold Eckert; Rüdiger Maidhof, all of Bad Neustadt/Saale, Fed. Rep. of Germany

[73] Assignee: Preh, Elektrofeinmechanische Werke, Jakob Preh, Nachf. GmbH & Co., Bad Neustadt/Saale, Fed. Rep. of Germany

[21] Appl. No.: 191,758

[22] Filed: May 3, 1988

Related U.S. Application Data

[63] Continuation of Ser. No. 916,518, Oct. 8, 1986, abandoned.

[30] Foreign Application Priority Data

Oct. 8, 1985 [DE] Fed. Rep. of Germany ....... 3535881

[51] Int. Cl.[4] ............................................ G01D 11/28
[52] U.S. Cl. .......................................... 362/26; 362/32
[58] Field of Search ..................................... 362/26, 32

[56] References Cited

U.S. PATENT DOCUMENTS

| 2,355,149 | 8/1944 | deGiers ............................ 177/329 |
| 2,874,268 | 2/1959 | Martin ............................... 240/2.1 |
| 4,646,206 | 2/1987 | Bauer et al. ....................... 362/26 |

FOREIGN PATENT DOCUMENTS 3317807 11/1984 Fed. Rep. of Germany .
433589 8/1911 France .

Primary Examiner—Carroll B. Dority, Jr.
Attorney, Agent, or Firm—Woodcock Washburn Kurtz Mackiewicz & Norris

[57] ABSTRACT

An illumination device for a front panel with illuminated areas, the latter being illuminated by an incandescent lamp sitting in a connection base located behind the front panel through at least one light guide. The connection base is placed behind the front panel so that the incandescent lamp points away from the cover member. The lamp extends behind the front panel to the light guides. To make the incandescent lamp easily replaceable without loss of light, a cover member is removably attached to the illumination device such that removal of the cover member permits ready access to the incandescent lamp/connection base.

20 Claims, 5 Drawing Sheets

ILLUMINATION DEVICE FOR A FRONT PANEL

This is a continuation of application Ser. No. 926,518, filed 10/8/86, now abandoned.

BACKGROUND OF THE INVENTION

This invention relates to an illumination device for a front panel such as those used in motor vehicles. More particularly, this invention relates to an illumination device for a front panel having illuminated areas which are illuminated through light guides placed behind the front panel and the light source being a lamp held in a connection base located behind the front panel.

Illumination devices of this kind are used, for example, in front panels whose illuminated areas serve as illumination or displays. Such front panels often have control elements. The illuminated areas can then indicate the particular setting of the control element. For example, such illumination devices are used in front panels in motor-vehicle control units, for example, in the ventilation or air-conditioning unit. They can also be used in consumer electronics devices. An example of such illumination devices may be found by reference to West German patent publication no. DE-OS 33 17 807.

In known illumination devices of the type mentioned, the lamp is difficult to remove when it becomes defective because it is located at an inaccessible point behind the front panel. It is therefore almost impossible for the user to replace the lamp in an easily accessible location, remote from the illuminated areas, since the light utilization of the lamp then decreases, and the lamp may cast stray light at undesired points.

The purpose of the invention is to recommend an illumination device of the above-mentioned type, in which the lamp is easily replaceable without opening or dismantiling the illumination device or the control unit, and its light is efficiently utilized, According to the invention, the above purpose is fulfilled in an illumination device of the above-mentioned type by the fact that removably attached to the front panel is a cover member, beneath which the connection base is placed so that the lamp points away from the cover member, and that the lamp projects behind the front panel towards the light guides. By this means, after the cover member has been removed, the connection base and therefore the lamp as well, are easily accessible from the front panel. The lamp can therefore be easily replaced after the cover member has been removed. Because of the fact that the lamp extends from the base, placed in front, back towards the light guides, its light is emitted fairly directly towards the later, producing good light utilization, particularly if sufficient free space is available in the area behind the front side to allow optimization of the arrangement of the light guides. This arrangement additionally means that the lamp does not emit undesired stray light towards the front, which would have to be blocked off using special measures.

To prevent connection wires from being drawn out when the base is removed, a preferred embodiment of the invention provides for a contact device between the connection base and the electrical connection which disconnects when the connection base is removed. For this purpose, it is possible to provide, for example, a plug connection or another simple arrangement of contact springs.

The connection base can be placed on the front panel or base plate independent of the cover member. The result is that after removal of the cover member, the connection base must be removed separately. To circumvent this, according to one embodiment of the invention, the connection base is attached to the cover member. After removal of the cover member, the lamp is then directly accessible.

In one further development of the invention, the cover member is configured as a control part, e.g. a rotary knob. The result is that in the case of front panels on which control parts are provided in any event, an additional cover member and its attachment to the front panel are superfluous. The connection base and the lamp are then covered by the control part itself or one of the control parts themselves. In this case, it is recommended that the contact device consist of wiper contacts on the connection base and annular strip conductors on the electrical connectors.

To illuminate the control part and also make its position recognizable in the dark, it is preferable to place in the control part an additional light guide which ends in the region of the surface of the control part and is illuminated by the lamp. With this arrangement, it is advantageous for the connection base to be made of a transparent material and to be formed onto the light guide as a single piece.

SUMMARY OF THE INVENTION

An illumination device for a front panel having illuminated areas comprises a lamp located behind the front panel and orientated in a direction away from the front panel held in a connection base fitted tightly in a rotary knob member and electrically connected by contacts which disconnect when the connection base is removed. The illuminated areas are illuminated by a series of light guides which are placed in close proximity to the incandescent lamp such that light emitted by the lamp is transmitted by the light guides to the visible side of the front panel. Light not transmitted by the light guides is blocked from reaching the visible side by a base plate. In order to permit reaching the visible side by a base plate. In order to permit access to the lamp, the rotary knob membe rhas a cover member removably attached thereto which is accessible from the visible side of the front panel. The rotary base knob is also nonrotatably connected to a bevel wheel which in turn controls an actuation element for an electrical device such that manipulation of the cover member/rotary knob base would permit the variable operation of the electrical device having an actuation element controlled by the bevel wheel.

It is an object of the present invention to provide an illumination device for a front panel in which the lamp is easily replaceable without opening or dismantling the illumination device or control unit. It is a further object to provide an illumination device where its light is efficiently utilized and light emitted by the lamp is transmitted to the illuminated areas without undesired leakage. Yet another purpose of the invention to illuminate the control part to make its position recognizable in the dark.

BRIEF DESCRIPTION OF THE DRAWINGS

The present invention may be better understood and its numerous objects and advantages will become apparent to those skilledc in the art by reference to the accompanying drawings in which.

DESCRIPTION OF THE PREFERRED EMBODIMENT:

Configuration of the Apparatus

Figure 3:
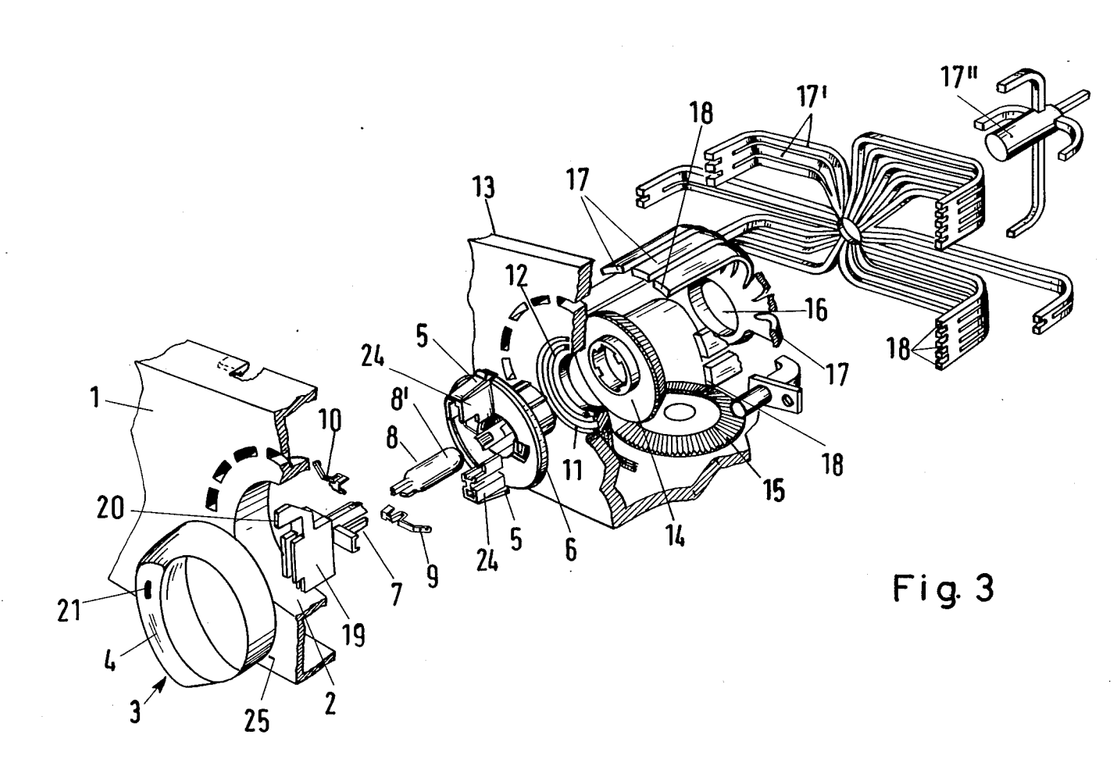
FIG. 3 is an exploded view of the illumination device of FIG. 1.
Figure 4:
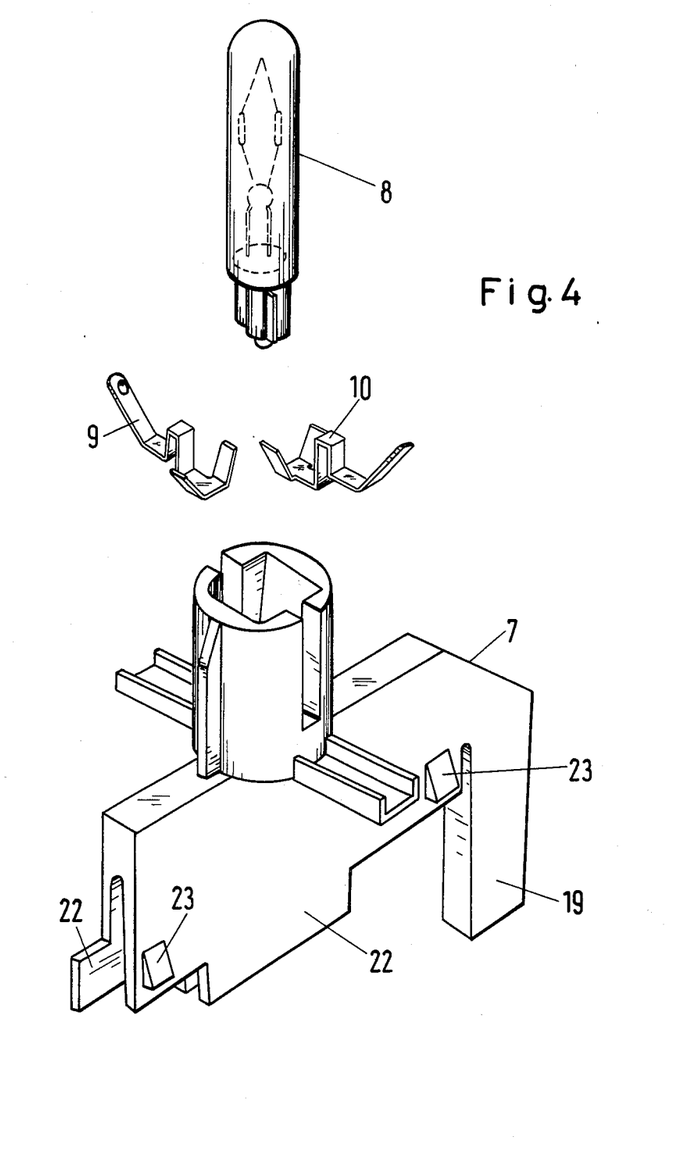
FIG. 4 is a side view of the connection base of the illumination device of FIGS. 1 and 3.

Configuration of the illumination device for a front panel may best be seen by reference to FIG. 3. A front panel 1 which rests upon a base plate 13 has a recess 2 in which a control member such as a rotary knob 3 sits. The rotary knob 3 includes an opaque cover member 4 such as a hood and a rotary knob unit member 6. The cover member 4 is snapped onto the spring arms 5 of the rotary knob base unit 6. Fitted tightly into the rotary knob base unit 6 is a connection base 7 shaped such that an incandescent lamp 8 may be inserted into and held by the connection base 7 and aligned such that the inserted incandescent lamp 8 points away from the rotary knob 3. The connection base is further provided with wiper contacts 9 and 10, each of which forms a plug connection with a connection wire (not shown) on the incandescent lamp 8. The wiper contacts 9 and 10 further contact annular strip conductors 11 and 12 which are placed upon the base plate 13. The wiper contacts 9 and 10 and annular strip conductors 11 and 12 forms the electrical contact means for conducting electrical power to the incandescent lamp 8.

The connection base 7, which is fitted in the rotary knob base unit 6, is nonrotatably connected to a bevel wheel 14 having conical teeth located on the side of base plate 13 opposite to front panel 1. The teeth of bevel wheel 14 engage the teeth of bevel wheel 15. Bevel wheel 15 may, in turn, be connected to an actuation element for a device which includes rotary knob 3 as its control knob. Such actuation element would typically permit the variable operation of a device controlled by the control knob.

The head 8' of the incandescent lamp 8 points away from cover member 4. The incandescent lamp 8 projects behind the front panel 1 and the base panel 13 into an opening 16 where the incandescent lamp 8 is surrounded by light guides 17. The light guides 17 pass through openings in the base plate 13 and the front panel 1 and terminate in suitably configured light guide surfaces 18 on the visible side 25 of the front panel 1.

The apparatus may be further provided with additional light guides 17' and 17' of similar design to light guides 17. Such additional light guides 17' and 17' would require additional openings (not shown in FIG. 3) in the base plate 13 and the front panel 1 to permit the additional light guides 17' and 17' to pass through base plate 13 and front panel and terminate in suitably configured light guides surfaces on the visible side 25 of front panel 1.

Formed on connection base 7 is an additional light guide 19. Light guide 19 passes through opening 21 in cover member 4 and terminates in a suitably configured light guide surface 20 located on the visible side of cover member 4. In one embodiment of the invention, such a configuration is accomplished by having connection base 7 comprised of a material capable of guiding light.

Operation of the Apparatus

When the incandescent lamp 8 is illuminated, the light guides 17 and 19 transmit the emitted light such that the surfaces 18 on the visible side 25 and the surface 21 on the cover member 4, respectively, are illuminated and visible. The orientation of the incandescent lamp 8 away from the cover member 4 and the visible side 25 of the front panel 1 and the placement of the incandescent lamp 8 behind the base plate 13 and the connection base 7 prevents any light emitted by the incandescnet lamp other than the light transmitted by light guides 18 and 20 from being visible at the visible side 25 of the front panel 1.

If the rotary knob 3 is turned, this causes the connection base 7 together with the light guide 19, the incandescent lamp 8, the wiper contacts 9 and 10, and the bevel wheels 14 and 15 to turn as well. The incandescent lamp would not be extinguished during rotation since the wiper contacts would slide along the strip conductors 11 and 12, thus permitting a constant electrical connection for incandescent lamp 8. The surface 20 of the light guide 19, both of which would rotate with the rotary knob 3, would indicate the position of the rotary knob 3. Further, the turning of bevel wheel 15, which would typically be connected to an actuation element for a device which includes rotary knob 3 as its control unit, would permit adjustment of the operating conditions for the device by the displacement of rotary knob 3, the extent of such adjustment being indicated by the position of the illuminated surface 20.

If the incandescent lamp 8 is defective and replacement of the lamp 8 is desired, the cover member 4 on the rotary knob 3 is pulled off the rotary knob base unit 6, thus disengaging the cover member 4 from a snap-fit with the spring arms 5 of rotary knob base unit 6. The removal of the cover member 4 reveals the connection base 7. The connection base is then unsnapped from its seat in the rotary knob base unit 6 by pressing the sides 22 of the connection base 7 together to unlatch snap lugs 23 on the sides 22 from their respective snap-fit with the corresponding retention element 24 on the rotary knob base unit 6. Once the snap lugs 23 are unsnapped, the snap lugs may be moved out of the corresponding retention element 24 and the connection base removed from rotary knob base unit 6. When the connection base 7 is removed, the wiper contacts 9 and 10 immediately separate from the strip conductors 11 adn 12, thus making the connection base 7 sufficiently accessible to the user so that easy removal of the defective incandescent lamp 8 held by connection base 7 and insertion of a new incandescent lamp 8 into connection base 7 may be accomplished.

The connection base 7, which now includes a replacement incandescent lamp 8, is reinserted into the rotary knob base unit 6. Snap lugs 23 of the connection base 7 snap into the retention means 24 of the rotary knob base unit 6 thus latching the connection base 7 and the rotary knob base unit 6 together. The wiper contact 9 and 10 and the strip conductors 11 and 12 automatically come into contact simultaneously with the insertion of connection base 7 into rotary knob base unit 6, electrically connecting the incandescent lamp 8. Cover member 4 is then placed on rotary knob base unit 6 by snapping the cover member 4 onto the spring arms 5 of rotary knob base unit 6, thereby completing the process of replacing incandescent lamp 8.

Figure 1:
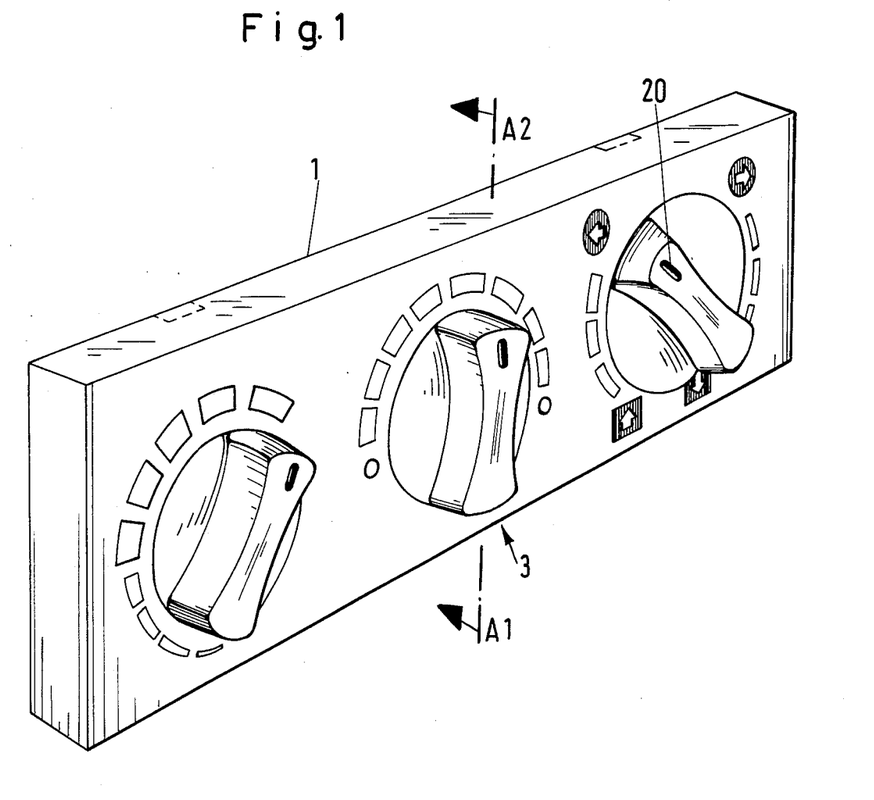
FIG. 1 shows a front view of a front panel which includes an illumination device which embodies the present invention.
Figure 1A:
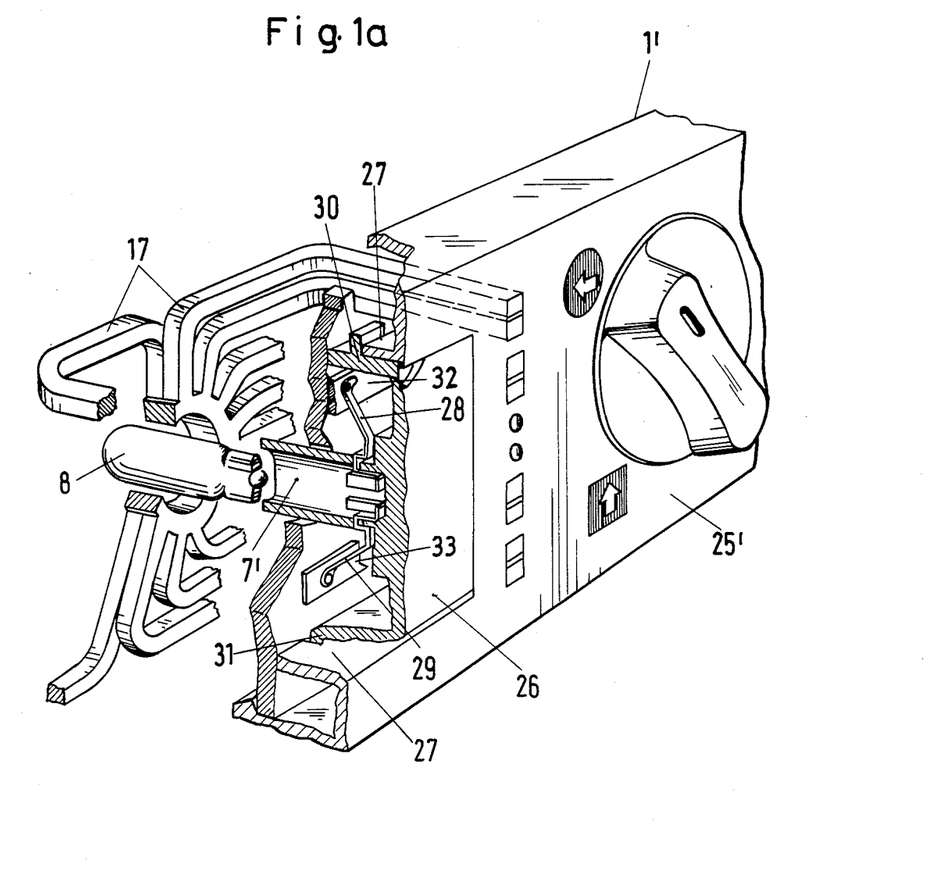
FIG. 1a is a partial view of a front panel which includes an alternative embodiment of the present invention.
Figure 2:
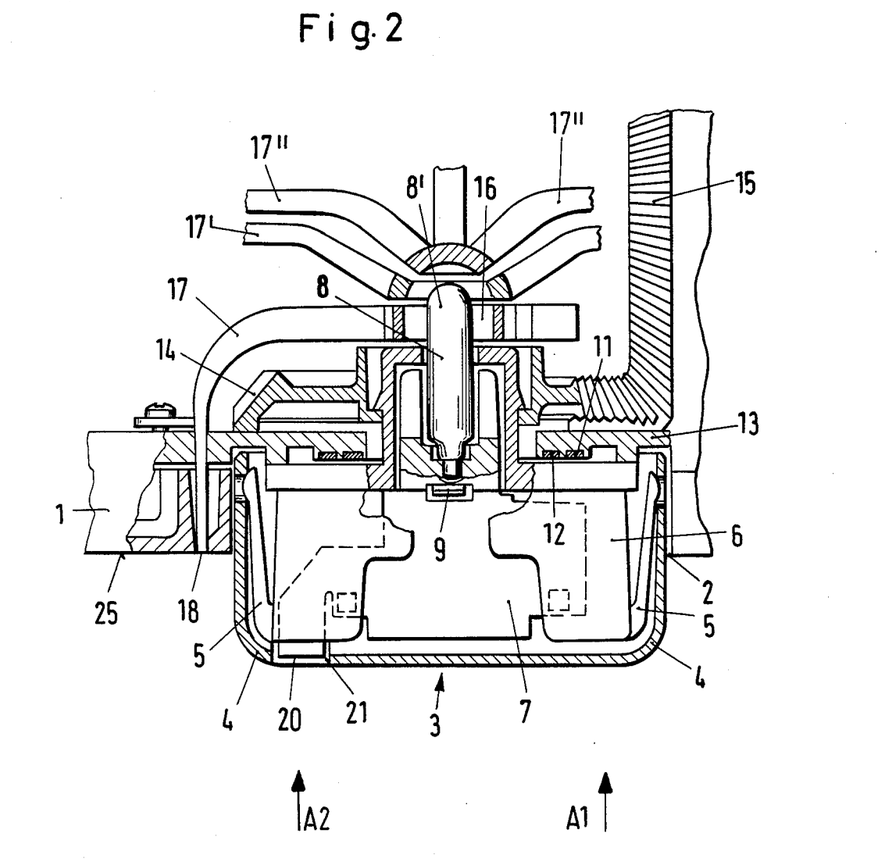
FIG. 2 is a cross-sectional view taken along line A1—A2 of FIG. 1.

An alternate embodiment of the illumination device for a front panel may be seen by reference to FIG. 1a. A front panel 1', which has an illumination device incorporated therein, includes a connection base 7' and a cover member 26 being configured as a single element. The cover member 26 includes protruding edges 30 and 31. Protruding edge 31 supports the cover member 26 by contacting base plate unit 13 and protruding edge 30 holds the cover member 26 in seat 27 by forming a latching fit with seat 27. If the incandescent lamp 8 is defective and replacement of lamp 8 is desired, protruding edge 30 is unlatched from seat 27 by pulling cover member 26 out of seat 27 in the front panel 1'. Because the cover member 26 and connecting base 7' are configured as a single element, connection base 7' is also pulled out, lifting contact springs 28 and 29 up from the strip conductors 32 and 33 respectively, thus breaking the electrical connection between incandescent lamp 8 and strip conductors 30 and 31. Incandescent lamp 8 is immediately exposed by the pulling out of connection base 7' and replacement of lamp 8 may then be accomplished. Reinserting the cover member 26/connection base 7 into seat 27 such that the protruding edge 30 of cover re-engages seat 27 in a latching connection, re-establishing contact between strip conductors 32 and 33 and contact springs 28 and 29 respectively, thus completing the electrical connection for incandescent lamp 8'.

Thus, there has been described and illustrated herein apparatus for an illumination device for a front panel. However, those skilled in the art will recognize that many modifications and variations besides those specifically mentioned may be made in the techniques described herein without departing substantially from the concept of the present invention. Accordingly it should be clearly understood that the form of the invention described herein is exemplary only, and it is not intended as a limitation on the scope of the present invention.

What is claimed is:

1. A front panel and means for illuminating said panel comprising a lamp, light guides placed behind said front panel, said light guides extending at least to said front panel for illuminating said front panel, a connection base for holding said lamp, an adjusting member for rotatable control, and means for conducting electrical power to said lamp, characterized in that said adjusting member for rotatable control further cmprises a rotary knob, a cover member removably attached to said rotary knob, said connection base removably attached to said rotary knob in a latching fit, wherein said connection base is placed behind said cover member such that said lamp projects behind said front panel and towards said light guides, said light guides communicating light projected by said lamp to said front panel.

2. An illumination device according to claim 1 characterized in that said rotary knob aligns said connection base and said cover member such that said connection base and said cover member can be removed in the same direction.

3. An illumination device according to claim 1 characterized in that said connection base further comprises sides, wherein said latching fit between said connection base and said rotary knob may be unlatched by pressing the sides of said connection base together.

4. An illumination device according to claim 1 characterized in that said connection base is capable of guiding light.

5. An illumination device according to claim 2 characterized in that said connection base is capable of guiding light.

6. An illumination device according to claim 3 characterized in that said connection base is capable of guiding light.

7. An illumination device according to claim 1 characterized in that said lamp further comprises electrical connection means, and said means for conducting power to said lamp further comprises electrical contact means placed between said connection base and the electrical connection means of said lamp, said electrical contact means being disconnected when said connection base is removed.

8. An illumination device according to claim 1 characterized in that said cover member is a hood of said rotary knob.

9. An illumination device according to claim 1 characterized in that said illumination device further comprises a base plate placed behind said front panel and said cover member is retained by said rotary knob which is rotatably mounted on said base plate.

10. An illumination device according to claim 8 characterized in that said illumination device further comprises a base plate placed behind said font panel and said hood is retained by said rotary knob which is rotatably mounted on said base plate.

11. An illumination device according to claim 4 characterized in that said connection base further comprises a light guide formed onto said connection base, said light guide having an end which terminates at an opening of said cover member.

12. An illumination device according to claim 9 characterized in that said connection base further comprises a light guide formed onto said connection base, said light guide having an end which terminates at an opening of said cover member.

13. An illumination device according to claim 9 characterized in that said connection base in concentrically fitted in said rotary knob.

14. An illumination device according to claim 11 characterized in that said connection base is concentrically fitted in said rotary knob.

15. An illumination device according to claim 12 characterized in that said connection base is concentrically fitted in said rotary knob.

16. An illumination device according to claim 6 characterized in that said electrical contac tmeans comprises at least one contact on said connection base and at least one conductor on said base plate.

17. A front panel and means for illuminating said front panel, comprising:
a cover member;
a lamp disposed within said front panel;
means for supporting said lamp within said front panel;
means for conducting electrical power to said lamp;
at least one light guide extending at least to said front panel for transmitting light emitted by said lamp to said front panel;
means for rotatably supporting said cover member, said cover member removaly attached to said means for rotatably supporting said cover member;
wherein said means for supporting said lamp is placed behind said cover member such that said lamp projects behind said front panel and towards said light guides, said means for supporting said lamp projects behind said front panel and towards said light guides, said means for supporting said lamp attached to said means for rotatably supporting said cover member.

18. The illumination device of claim 17 wherein said cover member is rotatable.

19. The illumination device of claim 17 wherein said means for conducting electrical power to said lamp is disconnected when said means for supporting said lamp is removed from said means for rotatably supporting said cover member.

20. The illumination device of claim 17 wherein said means for supporting said lamp within said front panel further comprises a light guide for transmitting additional light emitted by said lamp to the front end of said cover member.

* * * * *

UNITED STATES PATENT AND TRADEMARK OFFICE
CERTIFICATE OF CORRECTION

PATENT NO. : 4,800,466

DATED : January 24, 1989

INVENTOR(S) : Karl-Heinz Bauer; Gerold Eckert; Rudiger Maidhof

It is certified that error appears in the above-identified patent and that said Letters Patent is hereby corrected as shown below:

Column 2, line 44, please change "membe rhas" to --member has--.

Column 2, line 67, please change "skilledc" to --skilled--

Column 4, line 51, please change "adn" to --and--

Column 6, claim 16, line 51, please change "contac tmeans" to --contact means--

Signed and Sealed this

Seventh Day of January, 1992

Attest:

HARRY F. MANBECK, JR.

*Attesting Officer*      *Commissioner of Patents and Trademarks*